(12) United States Patent
Grover et al.

(10) Patent No.: US 9,025,464 B2
(45) Date of Patent: May 5, 2015

(54) METHOD FOR DESIGN OF NETWORKS BASED ON P-CYCLES

(75) Inventors: Wayne D. Grover, Edmonton (CA); John Doucette, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 1447 days.

(21) Appl. No.: 10/613,531

(22) Filed: Jul. 2, 2003

(65) Prior Publication Data

US 2004/0133663 A1 Jul. 8, 2004

Related U.S. Application Data

(60) Provisional application No. 60/430,931, filed on Dec. 5, 2002.

(51) Int. Cl.
| | | |
|---|---|---|
| *G01R 31/08* | (2006.01) | |
| *H04L 12/24* | (2006.01) | |
| *H04L 12/707* | (2013.01) | |
| *H04L 12/703* | (2013.01) | |
| *H04J 14/02* | (2006.01) | |

(52) U.S. Cl.
CPC ........ *H04L 41/0668* (2013.01); *H04L 41/0663* (2013.01); *H04L 45/22* (2013.01); *H04L 45/28* (2013.01); *H04J 14/0268* (2013.01); *H04J 14/0284* (2013.01); *H04L 41/145* (2013.01)

(58) Field of Classification Search
USPC ..................... 370/237, 238, 406, 230, 230.1
See application file for complete search history.

(56) References Cited

U.S. PATENT DOCUMENTS

| | | | |
|---|---|---|---|
| 4,956,835 A | 9/1990 | Grover | 370/228 |
| 5,812,524 A * | 9/1998 | Moran et al. | 370/228 |
| 5,850,505 A | 12/1998 | Grover et al. | 714/4 |
| 6,038,044 A * | 3/2000 | Fee et al. | 398/56 |
| 6,052,796 A | 4/2000 | Croslin | 714/4 |
| 6,331,905 B1 | 12/2001 | Ellinas et al. | 398/2 |
| 6,377,543 B1 | 4/2002 | Grover | |
| 6,404,734 B1 | 6/2002 | Stamatelakis | |
| 6,421,349 B1 * | 7/2002 | Grover | 370/408 |
| 6,510,139 B1 * | 1/2003 | Yoshida | 370/238 |
| 6,549,815 B1 * | 4/2003 | Kaji | 700/32 |
| 6,654,379 B1 | 11/2003 | Grover | |
| 6,819,662 B1 * | 11/2004 | Grover et al. | 370/351 |
| 6,914,880 B1 | 7/2005 | Grover | |
| 7,075,892 B2 | 7/2006 | Grover | |

(Continued)

FOREIGN PATENT DOCUMENTS

| | | |
|---|---|---|
| CA | 2161847 | 10/1995 |
| CA | 2307520 | 4/2000 |
| CA | 2360963 | 11/2001 |

OTHER PUBLICATIONS

U.S. Appl. No. 09/561,355, filed Apr. 28, 2000, Grover.

(Continued)

*Primary Examiner* — Phirin Sam
(74) *Attorney, Agent, or Firm* — Christensen O'Connor Johnson Kindness PLLC

(57) ABSTRACT

A simple and effective pre-processing step to reduce the complexity of solving p-cycle network design problems involving pre-selecting candidate cycles based on their topological score (TS) and a priori efficiency (AE) is disclosed. The disclosure contains a case study that examines joint optimization of working routes with placement of p-cycles.

11 Claims, 5 Drawing Sheets

(56) References Cited

U.S. PATENT DOCUMENTS

| | | | |
|---|---|---|---|
| 7,230,916 B2 | 6/2007 | Stamatelakis | |
| 7,260,059 B2 | 8/2007 | Grover | |
| 7,362,974 B2* | 4/2008 | De Patre et al. | 398/50 |
| 7,719,962 B2 | 5/2010 | Grover | |
| 2002/0004843 A1* | 1/2002 | Andersson et al. | 709/238 |
| 2002/0163682 A1* | 11/2002 | Su et al. | 359/110 |
| 2002/0167898 A1* | 11/2002 | Thang et al. | 370/216 |
| 2002/0187770 A1 | 12/2002 | Grover et al. | 455/403 |
| 2003/0055918 A1* | 3/2003 | Zimmel et al. | 709/220 |
| 2007/0076636 A1* | 4/2007 | Chow et al. | 370/258 |
| 2013/0114403 A1 | 5/2013 | Grover | |

OTHER PUBLICATIONS

M. Herzberg, S.J. Bye, "An optimal spare-capacity assignment model for survivable networks with hop limits", *IEEE Globecom 1994*, pp. 1601-1607.

W.D. Grover, "Distributed restoration of the transport network", in *Network Management into the 21st Century*, editors T. Pleyvak, S. Aidarous, IEEE/IEE Press Co-publication, Chapter 11, pp. 337-417, Feb. 1994.

R.R. Iraschko, M.H. MacGregor, W.D. Grover, "Optimal capacity placement for path restoration in mesh survivable networks", *ICC 1996*, Dallas, Jun. 1996, pp. 1568-1574.

W.D. Grover, D.Y. Li, "The forcer concept and express route planning in mesh-survivable networks", *Journal of Network and Systems Management*, vol. 7, No. 2, 1999, pp. 199-223.

W.D. Grover, M.H. MacGregor, "Potential for spare capacity preconnection to reduce crossconnection workloads in mesh-restorable networks", *Electronics Letters*, Fe. 3, 1994, vol. 30, No. 3, pp. 194-195.

W.D. Grover, D. Stamatelakis, "Self-organizing closed path configuration of restoration capacity in broadband mesh transport networks", *CCBR '98*, Jun. 1998, 12 pages.

R. Kawamura, K. Sato, I. Tokizawa, "Self-healing ATM networks based on virtual path concept", *IEEE Journal on Selected Areas in Communication*, vol. 12, No. 1, Jan. 1994, pp. 120-127.

R.R. Iraschko, "Path Resorable Networks", PhD Thesis, Edmonton, Alberta, 1996, pp. 56-85.

W.D. Grover, J.B. Slevinsky, M.H. MacGregor, "Optimized design of ring-based survivable networks", *Can. J. Elect. & Comp. Eng.*, vol. 20, No. 3, 1995, pp. 139-149.

W.D. Grover, D. Stamatelakis, "Cycle-oriented distribution preconfiguration: Ring-like speed with mesh-like capacity for self-planning network restoration", *ICC '98*, Jun. 1998, 7 pages.

D. Stamatelakis, "Theory and algorithms for preconfiguration of spare capacity in mesh restorable networks", M.Sc. Thesis, 1997.

R.R. Iraschko, M.H. MacGregor, W.D. Grover, "Optimal capacity placement for path restoration in STM or ATM mesh-survivable networks", *IEEE/ACM Trans. On Networking*, vol. 6, No. 3, Jun. 1998, pp. 325-336.

W.D. Grover, R.R. Iraschko, Y. Zheng, "Comparative methods and issues in design of mesh-restorable STM and ATM networks", *Telecommunication Network Planning*, pp. 169-200, editors: B. Sanso and P. Soriano, Kluwer Academic Publishers, 1999.

B.A. Coan, W.E. Leland, M.P. Vecchi, A. Weinrib, L.T. Wu, "Using distributed topology update and preplanned configurations to achieve trunk network survivability", *IEEE Trans. On Reliability*, vol. 40, No. 4, Oct. 1991, pp. 404-427.

B.A. Coan, M.P. Vecchi, L.T. Wu, "A distributed protocol to improve the survivability of trunk networks", *13th International Teletraffic Congress 1991*, Jun. 17-26, 1991, 7 pages.

D.A. Schupke, C.G. Gruber, A. Autenrieth, "Optimal configuration of p-cycles in WDM networks", *ICC 2002*, 5 pages.

W. Grover, J. Doucette, M. Clouqueur, D. Leung, "New options and insights for survivable transport networks", *IEEE Communications Magazine*, vol. 40, No. 1, pp. 34-41, Jan. 2002.

Y. Xiong, L.G. Mason, Restoration strategies and spare capacity requirements in self-healing ATM networks, *IEEE/ACM Transactions on Networking*, vol. 7, No. 1, Feb. 1999, pp. 98-110.

W. Grover, D. Stamatelakis, "Bridging the ring-mesh dichotomy with p-cycles", *IEEE/VDE DRCN 2000*, Munich, Germany, pp. 92-104, Apr. 2000.

Defendant AT&T Corp.'s Opening Brief on Claim Construction, Alberta Telecommunications Research Centre d/b/a TR Labs v. AT&T Corp., Case No. 3:09-cv-03883 (D.N.J.), Docket No. 65, dated May 27, 2011, 206 pages.

Declaration of Thomas N. Tarnay, Esq. (in support of Defendant AT&T Corp.'s Opening Brief on Claim Construction), Alberta Telecommunications Research Centre d/b/a TR Labs v. AT&T Corp., Case No. 3:09-cv-03883 (D.N.J.), Docket No. 66, dated May 27, 2011, 6 pages.

Plaintiff's Claim Construction Reply Brief, Alberta Telecommunications Research Centre d/b/a TR Labs v. AT&T Corp., Case No. 3:09-cv-03883 (D.N.J.), Docket No. 73, dated Jul. 22, 2011, 107 pages.

Defendant AT&T Corp.'s Responsive Brief on Claim Construction, Alberta Telecommunications Research Centre d/b/a TR Labs v. AT&T Corp., Case No. 3:09-cv-03883 (D.N.J.), Docket No. 74, dated Jul. 22, 2011, 176 pages.

Verizon and AT&T's Opening Brief on Claim Construction, Alberta Telecommunications Research Centre d/b/a TR Labs v. AT&T Corp., Case No. 3:09-cv-03883 (D.N.J.), Docket No. 87, dated Sep. 12, 2011, 385 pages.

Verizon and AT&T's Reply Supplemental Brief on Claim Construction, Alberta Telecommunications Research Centre d/b/a TR Labs v. AT&T Corp., Case No. 3:09-cv-03883 (D.N.J.), Docket No. 89, dated Oct. 21, 2011, 227 pages.

TR Labs' Technology Tutorial, Alberta Telecommunications Research Centre d/b/a TR Labs v. AT&T Corp., Case No. 3:09-cv-03883 (D.N.J.), Docket No. 92, dated Nov. 15, 2011, 159 pages.

TR Labs' Amended Technology Tutorial, Alberta Telecommunications Research Centre d/b/a TR Labs v. AT&T Corp., Case No. 3:09-cv-03883 (D.N.J.), Docket No. 96, dated Nov. 22, 2011, 153 pages.

Revised Claim Chart, Alberta Telecommunications Research Centre d/b/a TR Labs v. AT&T Corp., Case No. 3:09-cv-03883 (D.N.J.), Docket No. 101, dated Dec. 6, 2011, 51 pages.

Revised Claim Chart, Alberta Telecommunications Research Centre d/b/a TR Labs v. AT&T Corp., Case No. 3:09-cv-03883 (D.N.J.), Docket No. 102, dated Dec. 12, 2011, 97 pages.

Joint Claim Construction and Prehearing Statement, Alberta Telecommunications Research Centre d/b/a TR Labs v. AT&T Corp., Case No. 3:09-cv-03883 (D.N.J.), Docket No. 197, dated May 15, 2013, 38 pages.

Plaintiffs' Claim Construction Brief, Alberta Telecommunications Research Centre d/b/a TR Labs v. AT&T Corp., Case No. 3:09-cv-03883 (D.N.J.), Docket No. 214, dated Jun. 19, 2013, 143 pages.

Defendants' Opening Brief on Claim Construction, Alberta Telecommunications Research Centre d/b/a TR Labs v. AT&T Corp., Case No. 3:09-cv-03883 (D.N.J.), Docket No. 216, dated Jun. 19, 2013, 299 pages.

Plaintiffs' Responding Brief on Claim Construction, Alberta Telecommunications Research Centre d/b/a TR Labs v. AT&T Corp., Case No. 3:09-cv-03883 (D.N.J.), Docket No. 233, dated Jul. 31, 2013, 25 pages.

Defendants' Responsive Brief on Claim Construction, Alberta Telecommunications Research Centre d/b/a TR Labs v. AT&T Corp., Case No. 3:09-cv-03883 (D.N.J.), Docket No. 234, dated Jul. 31, 2013, 66 pages.

Amended Version of Plaintiffs' Responding Brief on Claim Construction, Alberta Telecommunications Research Centre d/b/a TR Labs v. AT&T Corp., Case No. 3:09-cv-03883 (D.N.J.), Docket No. 238, dated Aug. 19, 2013, 41 pages.

Draft of Proposed Claim Construction Memorandum, Alberta Telecommunications Research Centre d/b/a TR Labs v. AT&T Corp., Case No. 3:09-cv-03883 (D.N.J.), Docket No. 279, dated Dec. 23, 2013, 25 pages.

Civil Docket, Alberta Telecommunications Research Centre d/b/a TR Labs v. AT&T Corp., Case No. 3:09-cv-03883 (D.N.J.), dated Apr. 17, 2014, 37 pages.

(56) References Cited

OTHER PUBLICATIONS

Memorandum and Order (Claim Construction), *Verizon Services Corp.* v. *Alberta Telecommunications Research Centre* d/b/a TR Labs, Case No. 3:11-cv-01378 (D.N.J.), Docket No. 62, dated Aug. 10, 2012, 82 pages.
Joint Claim Construction and Prehearing Statement, Alberta Telecommunications Research Centre d/b/a *TR Labs* v. *Verizon Communications, Inc.*, Case No. 2:10-cv-01132 (D.N.J.), Docket No. 41, dated May 31, 2011, 29 pages.
Civil Docket, Alberta Telecommunications Research Centre d/b/a *TR Labs* v. *Verizon Communications, Inc.*, Case No. 3:10-cv-01132 (D.N.J.), dated Sep. 26, 2013.
Civil Docket, *Alberta Telecommunications Research Centre* v. *CenturyLink, Inc.*, Case No. 1:12-CV-00581 (D. Colo.), dated Sep. 26, 2013.
Civil Docket, Telecommunications Research Laboratories d/b/a *TR Labs et al.* v. *Earthlink, Inc. et al.*, Case No. 2:12-CV-00599 (E.D. Tex.), dated Sep. 26, 2013.
Civil Docket, *Telecommunications Research Laboratories et al.* v. *Qwest Communications Co., LLC et al.*, Case No. 3:12-CV-06199 (D.N.J.), dated Sep. 26, 2013.
Civil Docket, Telecommunications Research Laboratories d/b/a *TR Labs et al.* v. *Earthlink, Inc. et al.*, Case No. 3:12-CV-06401 (D.N.J.), dated Sep. 26, 2013.
Civil Docket, *Telecommunications Research Laboratories et al.* v. *BT Americas, Inc.*, Case No. 3:12-CV-06828 (D.N.J.), dated Sep. 26, 2013.
Civil Docket, *Telecommunications Research Laboratories et al.* v. *Frontier Communications of America, Inc.*, Case No. 3:12-CV-06829 (D.N.J.), dated Sep. 26, 2013.
Civil Docket, *TR Technologies, Inc.* v. *Cablevision Systems Corp.*, Case No. 3:12-CV-06830 (D.N.J.), dated Sep. 26, 2013.
Defendant AT&T Corp.'s Answer, Affirmative Defenses and Counterclaims to Plaintiff's Second Amended Complaint, Alberta Telecommunications Research Centre d/b/a *TR Labs* v. *AT&T Corp.*, Case No. 3:09-cv-03883 (D.N.J.), Docket No. 44, dated May 27, 2011, 81 pages.
Defendant AT&T Corp.'s Amended Answer, Affirmative Defenses and Counterclaims to Plaintiff's Second Amended Complaint, Alberta Telecommunications Research Centre d/b/a *TR Labs* v. *AT&T Corp.*, Case No. 3:09-cv-03883 (D.N.J.), Docket No. 119, dated Aug. 29, 2012, 82 pages.

\* cited by examiner

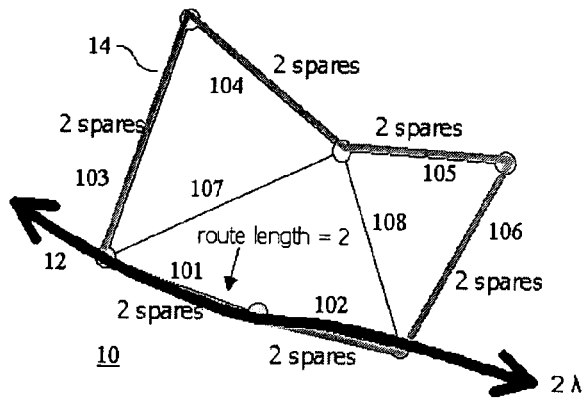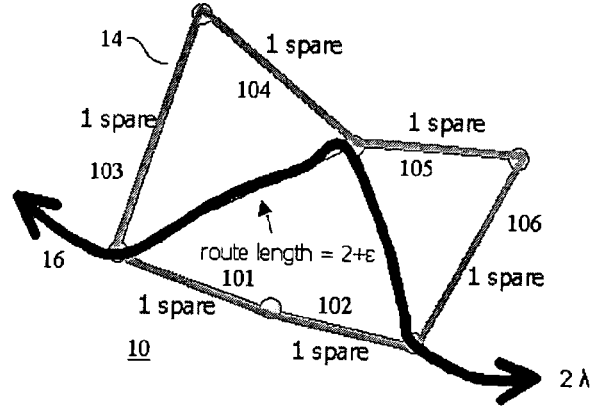
Fig. 1(a)    Fig. 1(b)
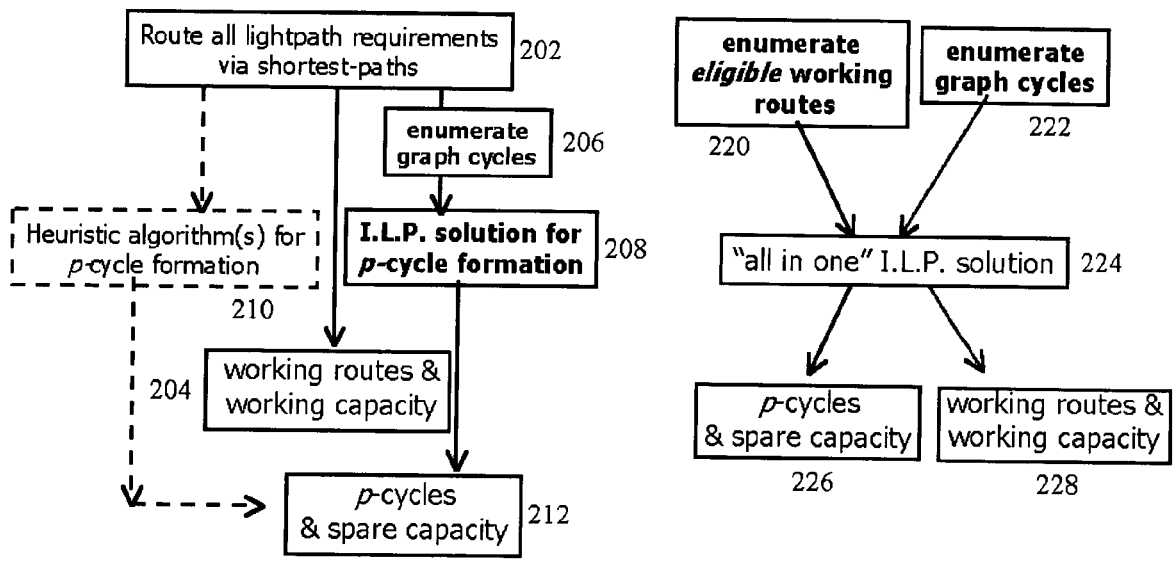
Fig 2(a)    Fig 2(b)

METHOD FOR DESIGN OF NETWORKS BASED ON P-CYCLES

CROSS-REFERENCE TO RELATED APPLICATIONS

This application claims priority from U.S. provisional application No. 60/430,931 filed Dec. 5, 2002.

BACKGROUND OF THE INVENTION p-Cycles offer a promising new approach to optical network survivability, summed up by the notion of "ring like speed with mesh-like efficiency". Being based on closed cyclic paths of protection capacity, p-cycles offer ring-like speed and pre-configured simplicity but are essentially as efficient as span-restorable mesh networks thereby offering three to six times greater demand-carrying capability than rings for a given transmission capacity. Unlike rings, p-cycles protect straddling failures as well as on-cycle failures and allow working paths to take shortest routes. This combination of properties, suggest the prospect of an optical network that is survivable to any single span failure with as little as ~35% redundancy, depending on graph topology and demand pattern. In contrast, optical rings and fiber-level cycle double covers are at best 100% redundant (and often much higher) in terms of spare and unused working capacity. p-Cycles also provide the much-touted "50 ms" speed, because only two nodes do any switching, and the failure-dependent local switchover actions are BLSR-like and known in advance.

p-Cycles are like rings but with support for the protection of straddling span failures as well as the usual ring-protection of spans of the ring itself (on-cycle failures). A straddling span has its end-nodes on the p-cycle, but is not itself part of the p-cycle, like a chord on a circle. With p-cycles, working paths also take any desired route over the graph and are not constrained to follow ring routings. When an on-cycle span fails, the surviving arc of the cycle is used just as in a BLSR ring. However, the same p-cycle is also accessible to support restoration of a straddling span failure, in which case two restoration paths are available from each unit of p-cycle protection capacity. In the limit of a full set of straddling span relationships, an N-hop p-cycle can protect up to N(N−2) units of working capacity, making it up to N−2 times more efficient than a corresponding ring. However, the design of a min-cost set of p-cycles to protect a given set of working flows is an NP-hard problem. The basic formulation generates large problem files that can be difficult to solve to optimality, primarily because of the size of the set of candidate cycles to consider. This is especially true when the jointly optimized problem or the consistent wavelength assignment problem is attempted. Some investigators are pursuing pure heuristics for the problem, and a fully distributed p-cycle forming process is known. This invention seeks to provide an improved method for designing a telecommunications network that optimizes routing of working demands and spare capacity, that is, that provides a solution to what is known as the joint optimization problem.

SUMMARY OF THE INVENTION

According to an aspect of this invention, a method of designing a telecommunications network including the method step of pre-selecting a reduced number of "high merit" p-cycle candidates which are then provided to an otherwise unchanged optimal solution model is presented.

Thus, there is provided a method of providing a mesh telecommunications network with spare capacity arranged in pre-configured cycles by pre-selecting a set of candidate cycles for forming into pre-configured cycles and allocating working paths and spare capacity in the mesh network based on the set of candidate cycles. The network is then provided with the spare capacity in pre-configured cycles determined by the allocation. The allocation of working paths and spare capacity may be carried out by joint optimiziation.

Pre-selecting candidate cycles may include ranking a set of closed paths in the mesh telecommunications network according to the degree to which each closed path protects spans on and off the closed path, and selecting candidate cycles from the set of closed paths, and preferably takes into account the cost of the closed path.

According to a further aspect of the invention, pre-selecting candidate cycles comprises:

a) determining a topological score of the closed paths in the set of closed paths, where the topological score of said closed path is increased by a value for each span within said closed path that is protected by said closed path, and increased by a larger value for each span not on said closed path that is protected by said closed path;

b) determining the a priori efficiency of each closed path, where the a priori efficiency of a closed path is determined by taking the ratio of the topological score of said closed path with the cost of said closed path; and c) choosing a select number of closed paths based on the a priori efficiency to be the pre-selected candidate cycles.

BRIEF DESCRIPTION OF THE DRAWINGS

There will now be given a brief description of preferred embodiments of the invention, by reference to the drawings, by way of illustration only and not limiting the scope of the invention, and in which:

FIG. 1(a) depicts a network with a p-cycle that protects a working path which is following its shortest route over the graph.

FIG. 1(b) depicts a network with a p-cycle the choice of which is also coordinated with a changed working path routing so that the total of working and spare capacity required is minimized.

FIG. 2(a) is a flow chart representing the steps in a non-joint approach to network design.

FIG. 2(b) is a flow chart representing the steps in a joint approach to network design.

DETAILED DESCRIPTION OF PREFERRED EMBODIMENTS

Figure 3A:
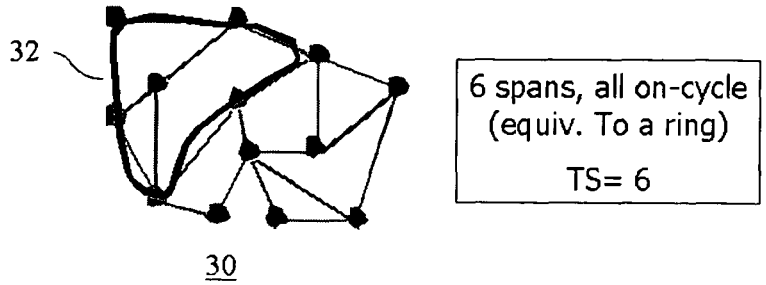
FIGS. 3(a) and (b) are examples of calculating the topological score of a p-cycle according to an aspect of the invention.

In this patent document, a mesh telecommunications network (also often called a "transport" network or "optical network") is a telecommunications network formed from plural nodes connected by plural spans. In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

This disclosure addresses two open and inter-related issues about the design of p-cycle based networks. One of these is to reduce the complexity of solving optimal p-cycle design problems, making it practical to continually re-optimize a p-cycle based network in service, adapting to changing demand patterns, or practical to do many different design and planning studies in a reasonable time using standard computer planning software for network design. The second advance is a first research use of the above solution technique to study how the efficiency of a p-cycle network increases under joint optimization of the working path routes with p-cycle placement.

The aspect of jointness in a p-cycle design problem will now be discussed. The issue is that one can either first route the working demands via shortest paths (or any other means) and then solve a corresponding minimum spare capacity allocation problem (the non-joint problem), or, attempt to optimize the choice of working routes in conjunction with the placement of spare capacity together (i.e., jointly) to minimize total capacity (the joint problem). An example of the effect of solving the joint problem is shown in FIGS. 1(a) and (b). Network 10 is shown with flow 12 representing 2 units of capacity 2λ, and p-cycle 14 consisting of spans 101-106. In FIG. 1(a), flow 12 passes through spans 101 and 102, while in FIG. 1(b), flow 16 passes through spans 107 and 108. In FIG. 1 (a), p-cycle 14 requires 2 units of spare capacity on spans 101-106, while FIG. 1(b) reduces the units of space capacity required for p-cycle 14 to one unit on spans 101-106 by increasing the length of the path of the working flow from 2 to 2+ε. Together these figures show how potentially advantageous it can be in terms of total capacity reduction, if the right choices of working path routing can be made, in conjunction with p-cycle placement choices, so as to realize the kind of savings evident in the example of FIG. 1.

A flow chart showing an example of how the non-joint problem is solved is shown in FIG. 2(a), where the first step in 202 is to route all lightpath requirements via the shortest path. Step 204 follows from this in defining all working paths and working capacities. To solve for the required p-cycles and spare capacity in 212, one can either enumerate all graph cycles as possible p-cycles in 206 and then use an ILP solution for p-cycle formation in 208, or one can use another heuristic algorithm(s) for p-cycle formation in 210. This process can be contrasted with the flow chart in FIG. 2(b), where the first steps 220 and 222 are to enumerate eligible working routes and enumerate graph cycles as potential p-cycles, respectively. These two sets are combined and solved in a single ILP solution in 224, from which the p-cycles and spare capacity are defined in 226, and the working routes and capacity are defined in 228.

It is known by published work that joint optimization reduces total capacity by as much as 28%, in conventional span restoration but under 10% for path restoration. But the corresponding benefit of joint design is not yet known for p-cycles, in part because of the additional complexity of solving the joint problem formulation. The pre-selection heuristic presented in this disclosure has been applied to obtain practical and virtually optimal solutions to the joint p-cycle design problem.

Figure 3B:
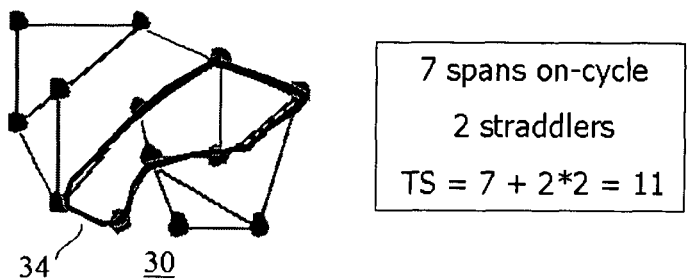

As it is desired to reduce the complexity of solving optimal p-cycle design problems, it is necessary to define the criteria used in pre-selecting potential p-cycles. Two pre-selection metrics, topological score and a priori efficiency are based on insights about what makes for the most efficient p-cycles in the context of a given network design. The topological score (TS) is defined by equation 1:

$$TS(j) \triangleq \sum_{i \in S} x_{ij} \quad (1)$$

where S is the set of spans, $x_{ij}=1$ if span i is part of cycle j, $x_{ij}=2$ if span i straddles cycle j and $x_{ij}=0$ otherwise. FIGS. 3(a) and (b) show examples of how the TS is calculated for two different p-cycles 32 and 34 respectively for the network 30. Cycle 32 is composed of 6 spans, with no straddling spans, while cycle 34 is composed of 7 spans, with two straddling spans. For each on-cycle span protection relationship, the TS is increased by 1, such as for spans 300 to 306 in FIG. 3(a) and spans 305 to 311 in FIG. 3(b). For each straddling span protection relationship, the TS is increased by 2, such as for spans 312 and 313 in FIG. 3(b). Thus, TS(32) in FIG. 3(a) receives a score of 6 because it protects 6 on-cycle spans with no straddling span protection, while TS(34) in FIG. 3(b) receives a score of 11 because it protects 7 on-cycle spans with 2 straddling spans being protected.

Figure 4A:
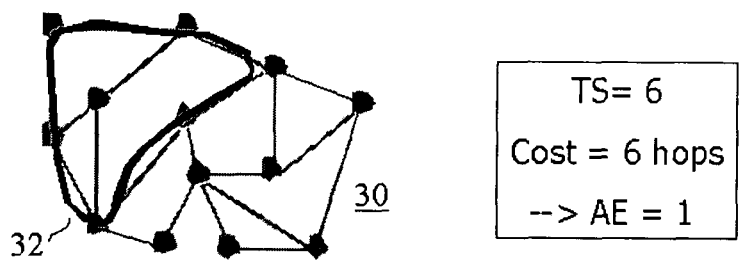
FIGS. 4(a) and (b) are examples of calculating the "a priori efficiency" of a p-cycle according to an aspect of the invention.
Figure 4B:
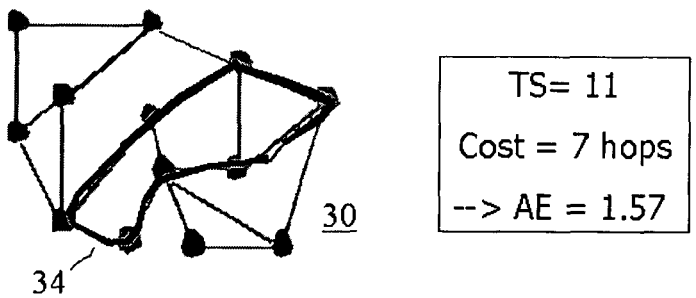

The a priori efficiency (AE) of a cycle j is defined by equation 2:

$$AE(j) \triangleq TS(j) \bigg/ \sum_{(i \in S | x_{ij}=1)} C_i \quad (2)$$

where TS(j) is the topological score for cycle j calculated previously and $C_i$ is the cost or distance of span i. An example of calculating the AE of two cycles is shown in FIGS. 4(a) and (b) where the network 30 and the p-cycles 32 and 34 of FIGS. 3(a) and (b) are depicted. The cost $C_{32}$ for cycle 32 is 6 and the cost $C_{34}$ is 7, being 6 and 7 "hops" in length, respectively. Thus, using TS(32) and TS(34) calculated previously, we find that AE(32)=1 and AE(34)=1.57. Note that rings always have AE=1.

Whereas the basic solution model requires representation of all distinct cycles (possibly up to a circumference limit), we simply rank the set of all distinct cycles by either TS or AE measures, and use only a limited number of the top-ranked candidates for representation in the optimal solution model. In the example above, cycle 34 would be ranked higher than cycle 32.

Once the set of candidate cycles of the network graph have been characterized in this way, the problem can be solved using, for example, an integer linear programming (ILP) formulation, where the objective function minimizes the total cost of spare capacity and (for the joint problem) working capacity. ILP formulations are well known in the art and need not be further described here. This function is subject to:

A. All lightpath requirements are routed.

B. Enough WDMchannels (or working channels in general) are provided to accommodate the routing of lightpaths in A.

C. The selected set of p-cycles give 100% span protection.

D. Enough spare channels are provided to create the p-cycles needed in C.

E. Integer p-cycles decision variables and integer capacity.

Applying the pre-selection criteria can be particularly useful in the joint optimization problem, where the formulation generates large problem files that can be difficult to solve optimally if there is no pre-selection.

Figure 5:
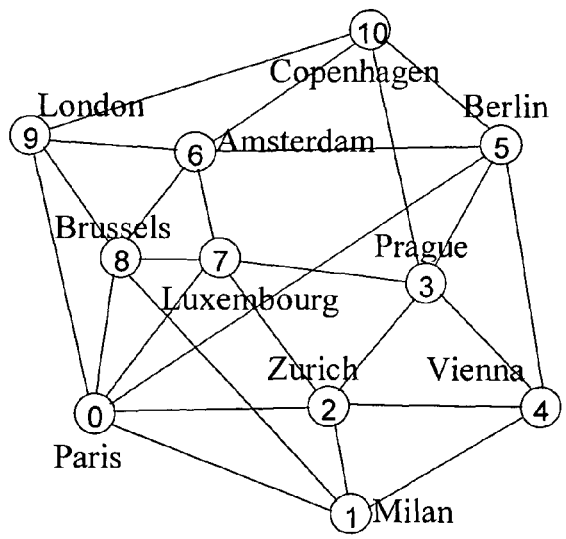
FIG. 5 depicts a network of European cities used as an example of the invention.
Figure 6:
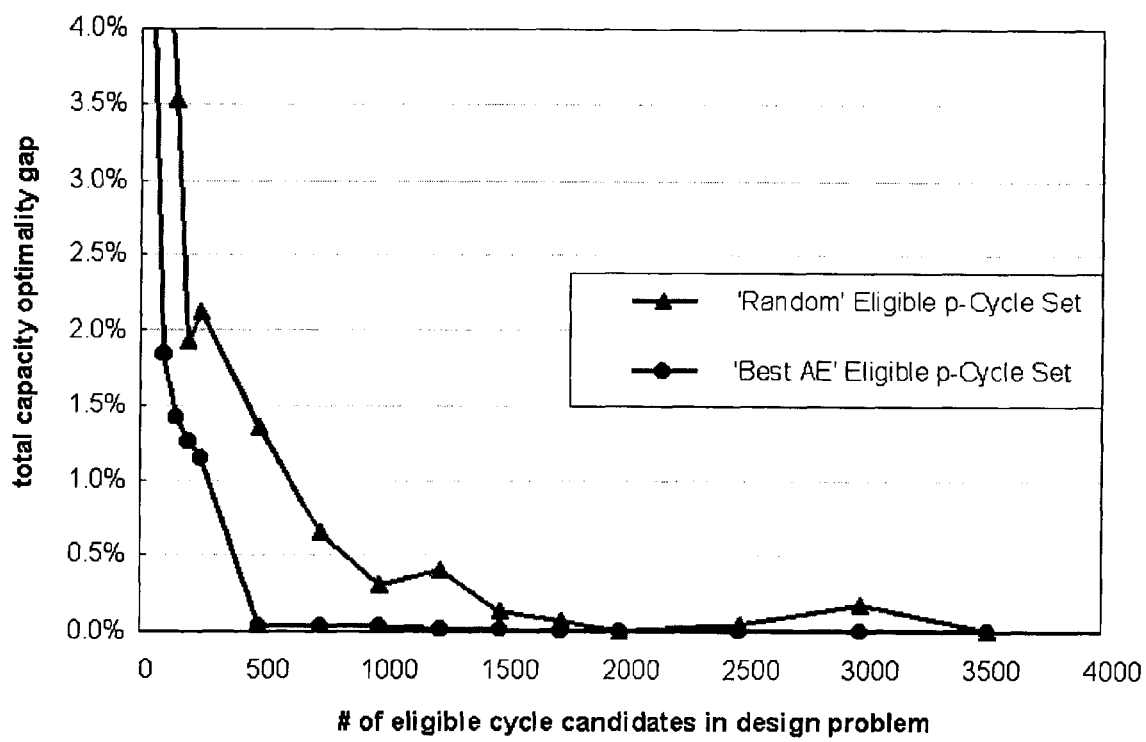
FIG. 6 compares results from using the selection criteria presented in this disclosure with those from a random selection in the non-joint case based on the COST 239 network.
Figure 7:
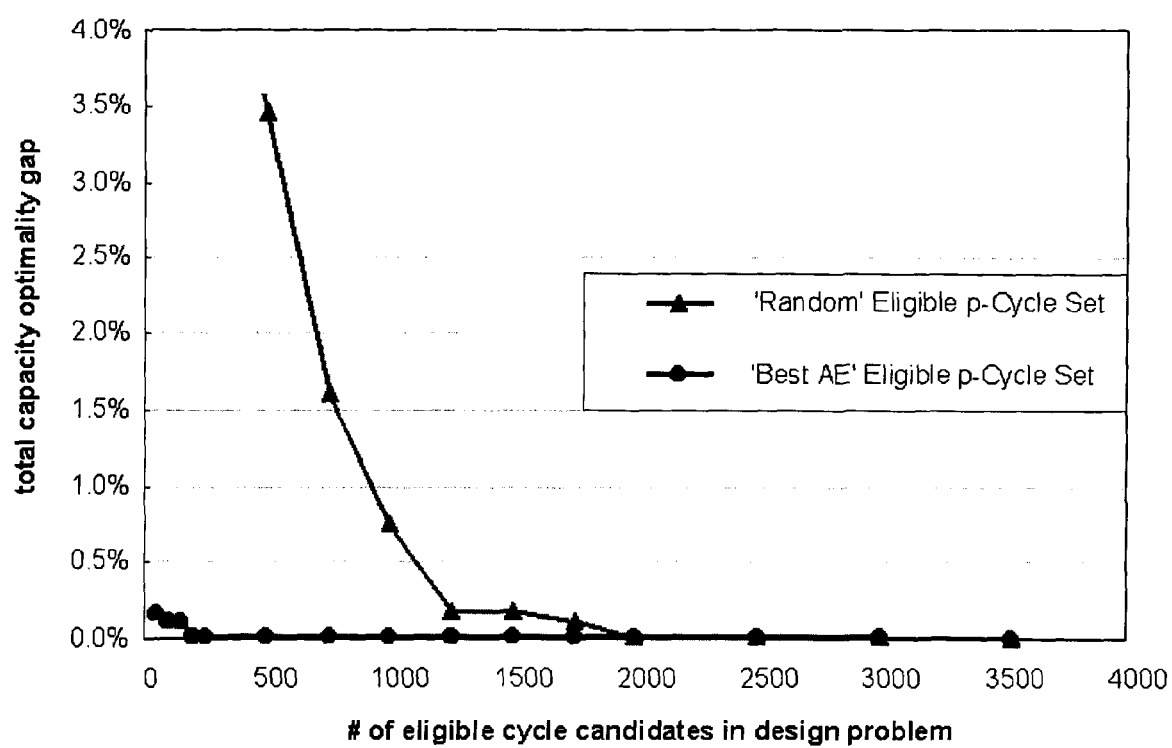
FIG. 7 compares results from using the selection criteria presented in this disclosure with those from a random selection in the joint case based on the COST 239 network.
Figure 9:
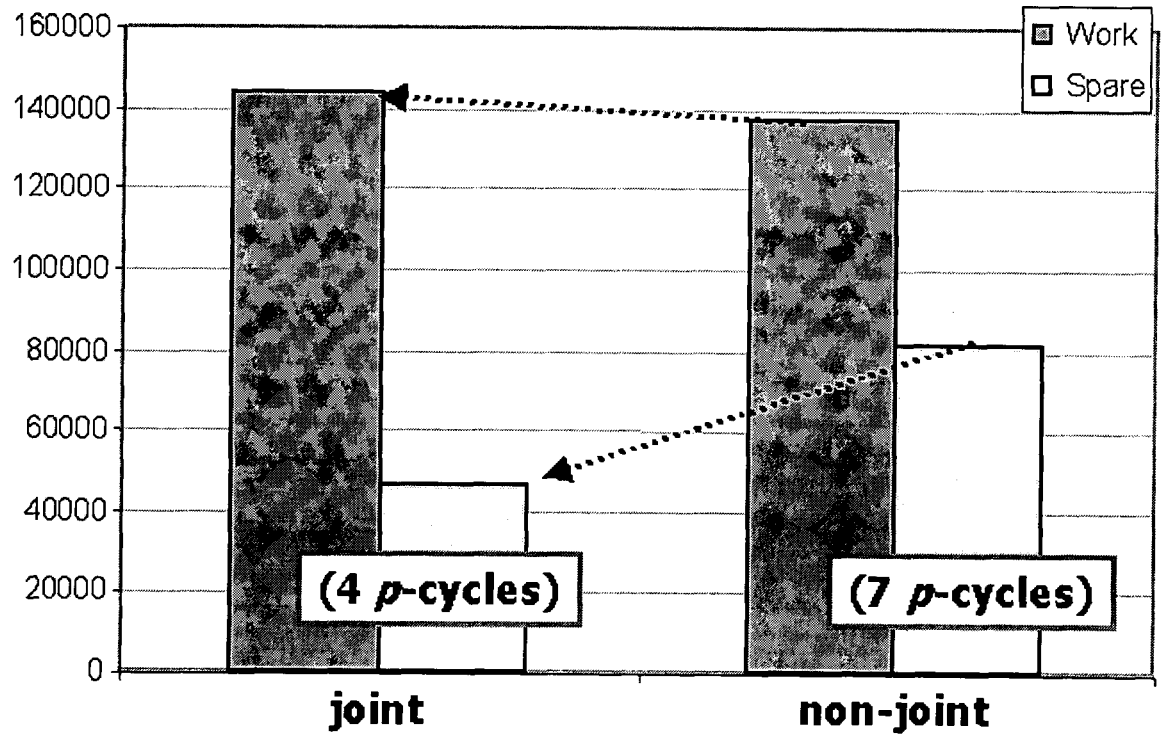
FIG. 9 compares some details of the joint and non-joint designs in the COST 239 network.

For a test case study, the COST 239 test case of 11 major European cities inter-connected by 26 spans and exchanging a total of 176 lightpath demands in a random mesh-like pattern shown in FIG. 5, varying from 1 to 11 lightpaths per node pair (average of 3.2) was considered, following Schupke in "Optimal Configuration of p-Cycles in WDM Networks," D. A. Schupke, C. G. Gruber, A. Autenrieth, *ICC* 2002. Selected results are summarized in FIGS. 6, 7, and 9, where, in FIGS. 6 and 7, the horizontal axis is the number of candidate cycles used in the exercise, and the vertical axis is the total capacity optimality gap in percentage. FIG. 6 shows results comparing a random set of selected candidate cycles with those selected using the selection criteria presented in this disclosure for the non-joint design case. Note that using the criteria allows us to reach near 0% gap in optimization using 500 candidate cycles, while randomly selecting candidate cycles reaches a 0% gap around 2000. (And a factor of four in size of the problem representation can mean much more than four times longer run-times). FIG. 7 shows results comparing a random set of selected candidate cycles with those selected using the selection criteria presented in this disclosure for the joint design case. Using the selection criteria allows us to reach ~0% gap using 200 candidate cycles, while the random case still requires 2000 candidates. FIG. 9 shows a bar graph of the capacity of the joint and non-joint design cases, with the capacity on the vertical axis. Note that the joint case uses 5% more working capacity, due to longer paths being chosen in some cases, but it also uses 43% less spare capacity giving a total network capacity reduction of 13%, and an overall network redundancy of 39%. As FIG. 9 also shows, a very significant extra practical advantage of the joint design is that it requires only 4 distinct p-cycle systems to be built, whereas the non-joint design requires 7 distinct p-cycles. Although hard to quantify, such reduction of "systems count" when designing transport networks is widely known to be of significant capital and operational savings value over and above the direct value of using less total capacity.

Note that when given only the 250 top-ranked cycles to consider by the AE metric the non-joint problem was solved to within 1.14% of optimal 857 times faster than the unrestricted non-joint problem. The joint problem is solved to within 0.16% of optimal in 1/17th of the time if provided with only 50 cycles as pre-selected by the ranked AE criterion.

Figure 8:
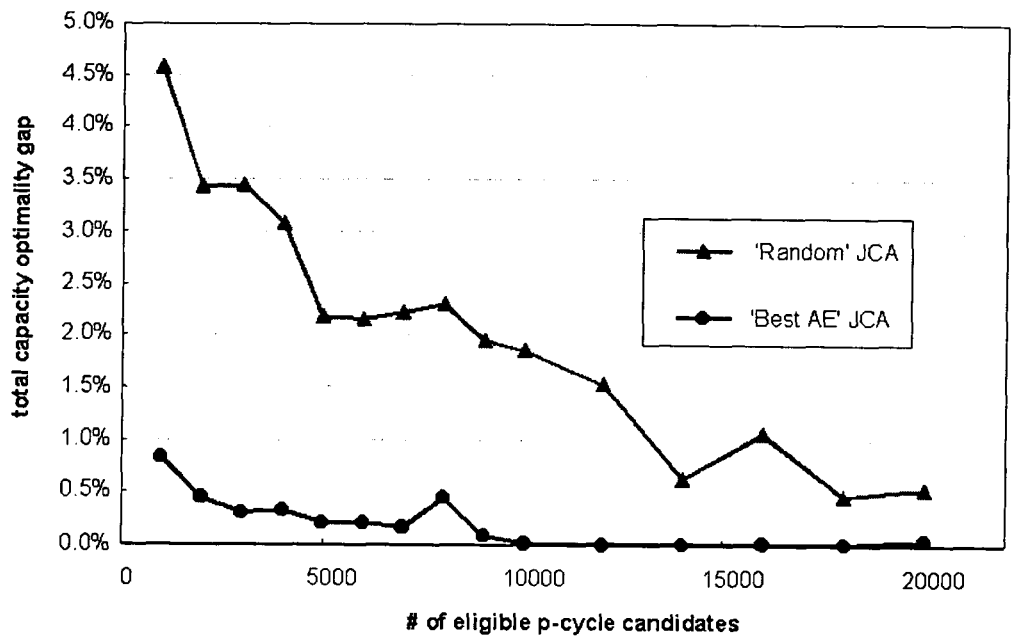
FIG. 8 compares results from using the selection criteria presented in this disclosure with those from a random selection in the non-joint case based on an additional test network.

Results from another test network are shown in FIG. 8. The network used consisted of 20 nodes, 40 spans, and 190 demand pairs. Compared are the results of a random selection for the joint design case (JCA) and using the AE selection criteria. While more candidate cycles were required for this more complex network, the selection criteria allows the network to drop below a 0.5% gap much sooner than the random case.

Two points concerning the impact and relevance of the invention can be drawn from the preceding test case. Firstly, we note that, at least in COST 239, the joint p-cycle design is as efficient as previously studied dynamic path-restorable designs in other studies to date. Such high efficiency is a direct benefit in terms of reduced cost or greater revenue from the same facilities, but an efficient network is also inherently a more flexible network because less of its resources are tied up for protection. Secondly, the simple process of pre-selecting candidate p-cycles by the AE metric greatly reduces p-cycle solution times so much that it may be practical to continually re-compute the optimal p-cycle configuration on-line as the network demand pattern evolves. This helps greatly to remove some prior objections to the practicality of p-cycle based networks and enables the vision of a continually adapting background layer of p-cycles.

It is possible have "too elite" a population of candidate cycles and it may be desirable to dilute the population with a few other types of candidates. The basic framework is one within which many specific heuristic ideas can be tried, all having to do with defining the reduced set of elite cycles to consider. First, some experience with memory and run times may show, for example, that a budget of 10,000 cycles is realistic to work with. The budget can be used up representing any number of mixed strategies for populating the elite P set.

An example could be:

Admit the 5,000 cycles found by the score-based selection above.

Add the 2,000 cycles with most absolute number of straddlers.

Add the 2,000 of the longest cycles.

Add 1,000 random cycles.

By itself the first set of cycles may not necessarily ensure feasibility. When choosing only individually elite cycles, there is no strict guarantee that a cycle will be represented that would cover, for example, a very long degree-2 chain connected to an otherwise highly connected mesh. However, cycles in batch three above definitely cover that eventuality.

Immaterial modifications may be made to the embodiments described here without departing from the invention.

What is claimed is:

1. A method of providing a mesh telecommunications network with spare capacity arranged in pre-configured cycles, where the mesh telecommunications network includes multiple cycles that may be potentially configured to provide restoration paths, the method comprising the steps of:

pre-selecting a set of candidate cycles for forming into pre-configured cycles before determining a joint allocation of working paths and spare capacity in the mesh telecommunications network, the set of candidate cycles comprising a sub-set of the multiple cycles selected based on one or more selection criteria, in which pre-selecting a set of candidate cycles includes ranking a set of closed paths in the mesh telecommunications network according to the degree to which each closed path protects spans on and off the closed path by comparison to the cost of the closed path, and selecting candidate cycles from the set of closed paths, in which spans on the closed path are scored differently from spans off the closed path;

determining a joint allocation of working paths and spare capacity in the mesh telecommunications network based on the set of candidate cycles; and providing the mesh telecommunications network with spare capacity arranged in pre-configured cycles according to the allocation determined in the preceding step.

2. The method of claim 1 in which ranking the set of closed paths takes into account the cost of the closed path.

3. The method of claim 1 in which pre-selecting the set of candidate cycles comprises:
- determining a topological score of the closed paths in the set of closed paths, where the topological score of said closed path is increased by a value for each span within said closed path that is protected by said closed path, and increased by a larger value for each span not on said closed path that is protected by said closed path;
- determining the a priori efficiency of each closed path, where the a priori efficiency of a closed path is determine by taking the ratio of the topological score of said closed path with the cost of said closed path; and
- choosing a select number of closed paths based on the a priori efficiency to be the pre-selected candidate cycles.

4. The method of claim 1 in which allocation of spare capacity is carried out using an integer linear programming (ILP) formulation, where an objective function minimizes the total cost of spare capacity.

5. The method of claim 4 in which the objective function is subject to the constraints:
- A. All lightpath requirements are routed;
- B. Enough channels are provided to accommodate the routing of lightpaths in A;
- C. The selected set of pre-configured cycles give 100% span protection;
- D. Enough spare channels are provided to create the pre-configured cycles needed in C; and
- E. The pre-configured cycles decision variables and capacity are integers.

6. The method of claim 1 in which allocation of spare capacity is carried out using an integer linear programming (ILP) formulation, where the objective function minimizes the total cost of spare capacity and working capacity.

7. The method of claim 6 in which the objective function is subject to the constraints:
- A. All lightpath requirements are routed;
- B. Enough channels are provided to accommodate the routing of lightpaths in A;
- C. The selected set of pre-configured cycles give 100% span protection;
- D. Enough spare channels are provided to create the pre-configured cycles needed in C; and
- E. The pre-configured cycles decision variables and capacity are integers.

8. The method of claim 1 in which a mixed selection strategy is used for pre-selecting candidate cycles.

9. The method of claim 8 in which the mixed selection strategy includes selecting candidate cycles randomly.

10. The method of claim 8 in which the mixed selection strategy includes selecting candidate cycles based on absolute number of straddling spans protected by the candidate cycles.

11. A telecommunications network designed according to the method of claim 1.

* * * * *